United States Patent [19]

Papa, Jr.

[11] Patent Number: 5,365,652
[45] Date of Patent: Nov. 22, 1994

[54] METHOD FOR MAKING A SEARCH COIL FRAME ASSEMBLY FOR METAL DETECTORS

[75] Inventor: Patrick A. Papa, Jr., Fitchburg, Mass.

[73] Assignee: B&D Liquidation Corp., Bannockburn, Ill.

[21] Appl. No.: 157,697

[22] Filed: Nov. 24, 1993

Related U.S. Application Data

[62] Division of Ser. No. 838,057, Feb. 19, 1992, Pat. No. 5,307,042.

[51] Int. Cl.⁵ .............................................. H01F 4/02
[52] U.S. Cl. ................................... 29/605; 29/602.1; 336/208; 336/84 C
[58] Field of Search ............... 29/602.1, 605; 336/84 C, 200, 198, 205, 208; 333/161

[56] References Cited

U.S. PATENT DOCUMENTS

| | | | |
|---|---|---|---|
| 3,483,499 | 12/1969 | Lugten | 336/180 |
| 4,308,512 | 12/1981 | Capecchiacci et al. | 336/57 |
| 4,517,540 | 5/1985 | McDougal | 336/205 |
| 4,641,114 | 2/1987 | Person | 333/161 |
| 4,902,997 | 2/1990 | Moran | 336/84 C |
| 5,010,314 | 4/1991 | Estrov | 336/198 |

FOREIGN PATENT DOCUMENTS

| | | | |
|---|---|---|---|
| 59-58805 | 4/1984 | Japan | 336/200 |
| 2-101715 | 4/1990 | Japan | 336/200 |
| 3-283404 | 12/1991 | Japan | 336/200 |
| 677295 | 8/1952 | United Kingdom | 336/200 |
| 993265 | 5/1965 | United Kingdom | 336/200 |

*Primary Examiner*—Carl E. Hall
*Attorney, Agent, or Firm*—Lorusso & Loud

[57] ABSTRACT

A method for making a search coil frame assembly for a metal detector, the method comprising providing a plurality of frame members, each having an aperture therethrough, providing selected ones of the frame members, respectively, with first, second and third grooves in face surfaces thereof, the grooves being formed so as to extend substantially around the apertures and to an edge of the frame member, placing electrically conductive strands in the grooves, and bonding the frame members together to close the grooves with the strands therein, the grooves being disposed such that the first and third grooves are spaced from the second groove by substantially equal distances on opposite sides of the second groove, the apertures forming a passage through the bonded frame members, and the strands substantially encircling the passage and extending from the frame.

20 Claims, 7 Drawing Sheets

METHOD FOR MAKING A SEARCH COIL FRAME ASSEMBLY FOR METAL DETECTORS

CROSS-REFERENCE TO RELATED APPLICATION

This is a division of application Ser. No. 07/838,057, now U.S. Pat. No. 5,307,042 filed Feb. 19, 1992, in the name of Patrick A. Papa, Jr.

BACKGROUND OF THE INVENTION

1. Field of the Invention

This invention relates to metal detectors of the type used to detect metal fragments in products, such as foodstuffs and pharmaceuticals, and is directed more particularly to a method for making an improved search coil frame assembly portion of such a detector.

2. Description of the Prior Art

In many industries, products destined for public consumption are conveyed automatically from station to station for processing. It is critical in some industries, as for example in the production of foodstuffs and pharmaceuticals, that tramp metal fragments introduced into the material processing stream be detected before the product is shipped to market.

It is known in the art that non-metallic material may be passed through an electromagnetic field and that if metal is present in the material such metal will disturb the electromagnetic field. A search coil is commonly used to create the electromagnetic field and metal passing through the field induces a signal indicating that the field has been disturbed. Responsive to the signal, the material stream can be stopped or diverted, accompanied if desired, by visual and/or audible alarm means.

The search coil assemblies of known metal detectors include a frame of non-metallic material, such as wood or plastic, having an aperture therethrough. The aperture is of size and configuration to permit passage therethrough of the product to be tested. For acceptable performance, it is necessary that the aperture be only slightly larger than the product passing therethrough. This requirement necessitates virtual custom tailoring for each product for which a machine is ordered, or maintenance of large inventory of various sizes by the manufacturer.

The frame portion of the assembly generally includes a top member, a bottom member, and two side members joined together to define a rectangular aperture. A known search coil assembly includes the frame, a carbon coating disposed over the external surfaces of the frame, a plastic coating disposed over the external surfaces of the carbon coating, coils of electrically conductive strands wound on the external walls of the plastic coating, a body of plastic adhered to the plastic coating and having the coils embedded therein, and a metal housing enveloping the plastic body. The electrically conductive strands typically include three strands, a "transmit" strand disposed centrally of the frame, and on either side thereof, and parallel thereto, a "receive" strand. Each of the strands has two free ends which pass through the plastic body and are connected to electronic circuitry disposed in the assembly or externally thereof.

A search coil assembly of the type described immediately above is shown and described in U.S. Pat. No. 4,814,734, issued Mar. 21, 1989, in the name of James M. Moran, and a method for making such assembly is shown and described in U.S. Pat. No. 4,819,321, issued Apr. 11, 1989, in the name of James M. Moran.

In an alternative construction, the electrically conductive strands are wound directly on the frame and enveloped in a coating of plastic applied to the external surfaces of the frame. A metal coating is, in turn, applied to the exterior surfaces of the plastic coating. On the internal walls of the frame there may be disposed a graphite coating, which is covered with a plastic sheeting. A search coil assembly of such construction is shown and described in U.S. Pat. No. 4,870,381, issued Sep. 26, 1989, in the name of James M. Moran, and a method for making such assembly is shown and described in U.S. Pat. No. 4,833,773, issued May 30, 1989, in the name of James M. Moran.

The outer metal layers of the assembly constructions described above may be covered with still another coating of plastic to protect the metal housing from scratches and other disfigurations, as shown and described in U.S. Pat. No. 4,902,997, issued Feb. 20, 1990, in the name of James M. Moran and U.S. Pat. No. 4,903,395, issued Feb. 27, 1990, in the name of James M. Moran.

The constructions described above have represented meaningful steps forward in the continuing search for methods of producing search coil assemblies at reduced expense and having equal or improved performance. A necessary portion of the search coil assembly is the frame portion, typically constructed of four blocks of wood or plastic, joined together to form the aperture, and the electrically conductive strands wound upon and/or around the frame. The process of properly joining the components, accurately winding the strands thereon, and providing a plastic body embedding the strands, involves considerable expenditure of time, and further requires a high degree of skill to avoid having to modify or rebuild the frame and coil assembly.

In U.S. patent application Ser. No. 07/557,626, filed Jun. 24, 1990, in the name of James M. Moran, there is shown and described a new construction of frame, involving laminate members joined together to form each frame member. In each laminate member is a layer of conductive material, such that upon joining of the frame members to form the frame assembly there is no need to add the usual graphite coating to provide shielding between the conductive strands and the aperture. In the '626 method of frame construction, the step of adding the conductive shield layer after completion of the frame is eliminated, but there remains the step of winding the conductive strands around the completed frame.

In order to further reduce the cost of manufacture of metal detectors, and to solve the ever-present problem of inventory and tailoring detectors to particular sizes and shapes of products, it would be beneficial to provide frame assemblies which are more simply and economically constructed and in which portions of the frame assembly may be inventoried and used for a number of sizes and shapes of apertures.

SUMMARY OF THE INVENTION

Accordingly, an object of the invention is to provide an improved method for making search coil assemblies, and more particularly a method for making the frame assembly portion of search coil assemblies.

With the above and other objects in view, as will hereinafter appear, a feature of the present invention is the provision of a method for making a search coil frame assembly for metal detectors, the method including the steps of providing a plurality of frame members, providing each of the frame members with an aperture therethrough, the apertures each being coincident in size and shape with the remaining apertures, each of the frame members having opposite face surfaces, providing first, second and third grooves, respectively, in selected ones of the face surfaces, forming the grooves such that each groove extends substantially around a selected one of the apertures and to an edge of the selected one of the frame members, placing electrically conductive strands in the grooves and leading out from the edge, bonding the strands in the grooves, and bonding the frame members together to close the grooves, the grooves being disposed such that the first and third grooves are spaced from the second groove by substantially equal distances on opposite sides of the second groove, the apertures forming a passage through the bonded frame members, and the strands substantially encircling the passage and extending from the frame assembly.

The above and other features of the invention, including various novel details of construction and combinations of parts, will now be more particularly described with reference to the accompanying drawings and pointed out in the claims. It will be understood that the particular method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
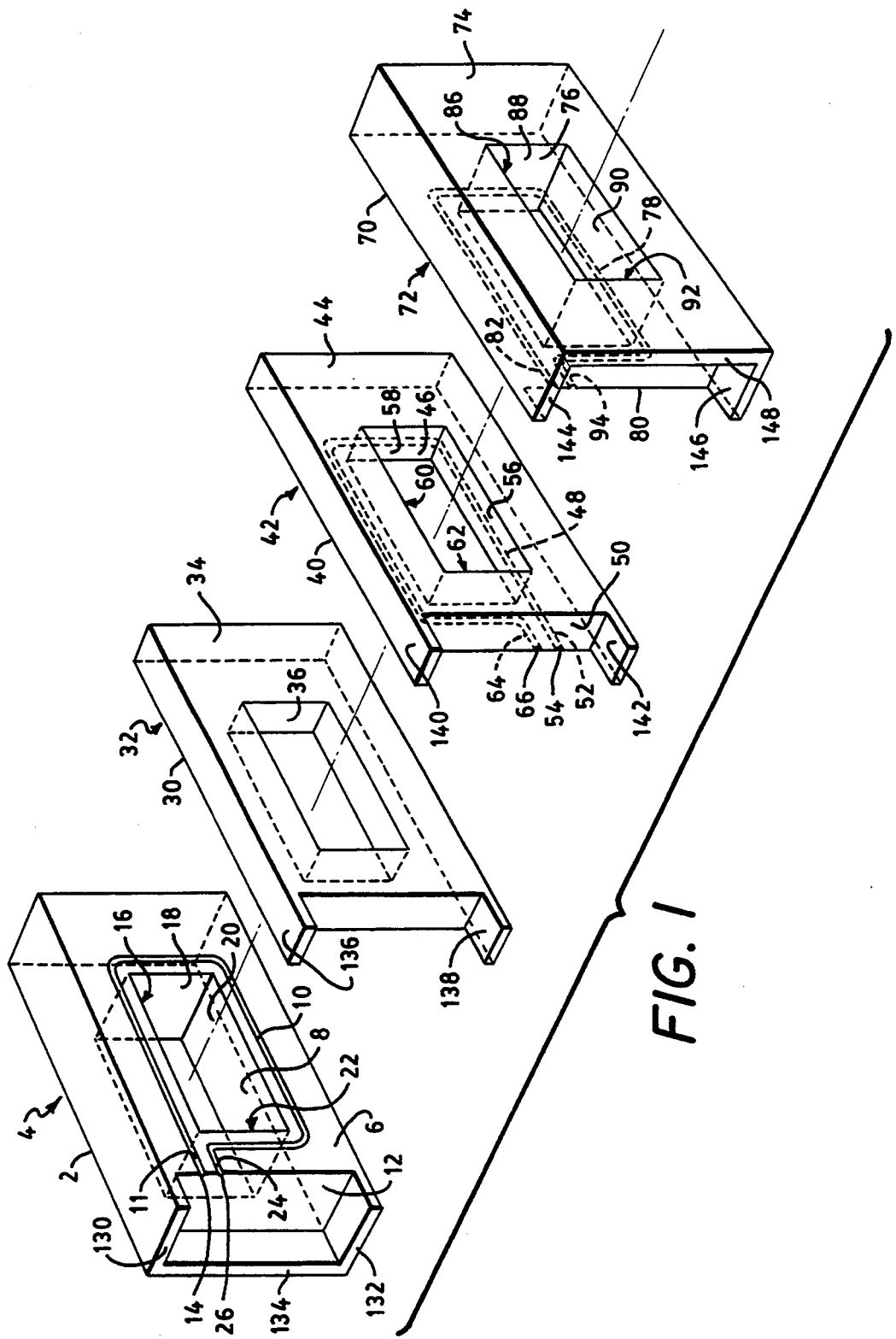
FIG. 1 is an exploded perspective view of one form of frame assembly provided in accordance with the invention.

Referring to the drawings, it will be seen that there is provided a first frame member 2, formed of non-electrically conductive material, such as plastic or wood. The first frame member 2 is provided with a first face surface 4, a second face surface 6, and a first aperture 8 extending through the frame member. Formed in the second face surface 6 is a first groove 10 which extends from an edge 12 of the first frame member 2, substantially around the first aperture 8 and back to the edge 12. The first groove 10 includes a first leg 11 and proceeds from a first opening 14 in the first frame member edge 12, parallel to and spaced from an aperture upper wall 16, a first side wall 18, a lower wall 20 and a second side wall 22. The first groove 10 includes a second leg 24 extending parallel to the first leg 11 and extending to a second opening 26 on the frame member edge 12, the second opening 26 being proximate, but spaced from, the first opening 14.

A second frame member 30 is provided, formed of non-electrically conductive material, and is provided with a third face surface 32, a fourth face surface 34, and a second aperture 36 extending therethrough. The second aperture 36 is made coincident in size and shape with the first aperture 8.

There is provided a third frame member 40, formed of non-electrically conductive material. The third frame member 40 is provided with a fifth face surface 42, a sixth face surface 44, and a third aperture 46 extending through the third frame member. Formed in the third frame member fifth face surface 42 is a second groove 48 which extends from an edge 50 of the third frame member, substantially around the third aperture 46 and back to the edge 50. The second groove 48 includes a first leg 52 and proceeds from a first opening 54 in the third frame member edge 50, parallel to and spaced from an aperture lower wall 56, a first side wall 58, an upper wall 60 and a second side wall 62. The second groove 48 includes a second leg 64 extending parallel to the first leg 52 and to a second opening 66 on the third frame member edge 50, the second opening 66 being proximate, but spaced from, the first opening 54. The third aperture 46 is made coincident in size and shape with the first and second apertures 8, 36.

Figure 5:
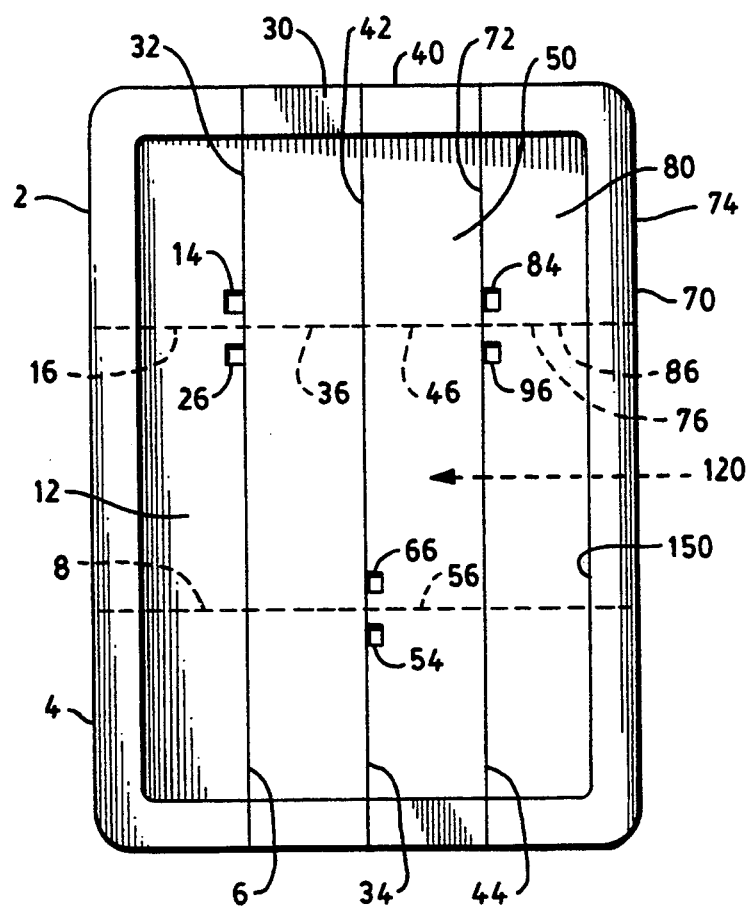
FIG. 5 is an end elevational view thereof.

A fourth frame member 70 is provided, formed of non-electrically conductive material, and includes a seventh face surface 72, an eighth face surface 74, and a fourth aperture 76 therethrough. A third groove 78 is formed in the seventh face surface 72, extending from an edge 80 of the fourth frame member 70, and substantially around the fourth aperture 76. The third groove 78 includes a first leg 82, and proceeds from a first opening 84 (FIG. 5) in the fourth frame member edge 80, parallel to and spaced from a fourth aperture upper wall 86, a first side wall 88, a lower wall 90 and a second side wall 92. The third groove 78 includes a second leg 94 extending parallel to the first leg 82 and to a second opening 96 (FIG. 5) on the frame member edge 80, the second opening 96 being proximate, but spaced from, the first opening 84. The fourth aperture 76 is made coincident in size and shape with the first, second and third apertures 8, 36 and 46.

The apertures 8, 36, 46, 76 and the grooves 10, 48, 78 may be formed by cutting through, or into, the frame members. In instances in which the form members are molded, the apertures and the grooves may be formed simultaneously with the respective frame members.

Figure 2:
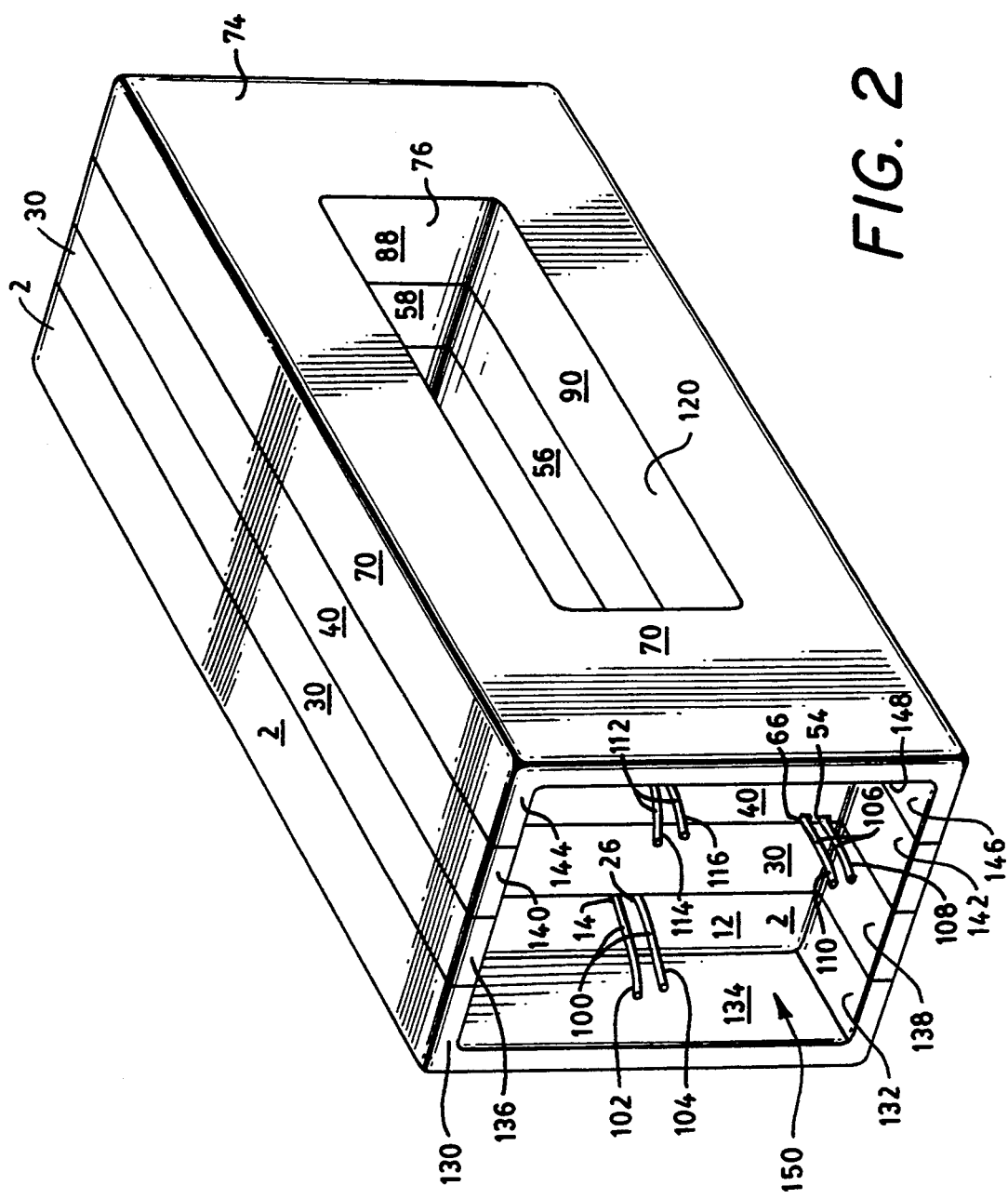
FIG. 2 is a perspective view thereof.
Figure 3:
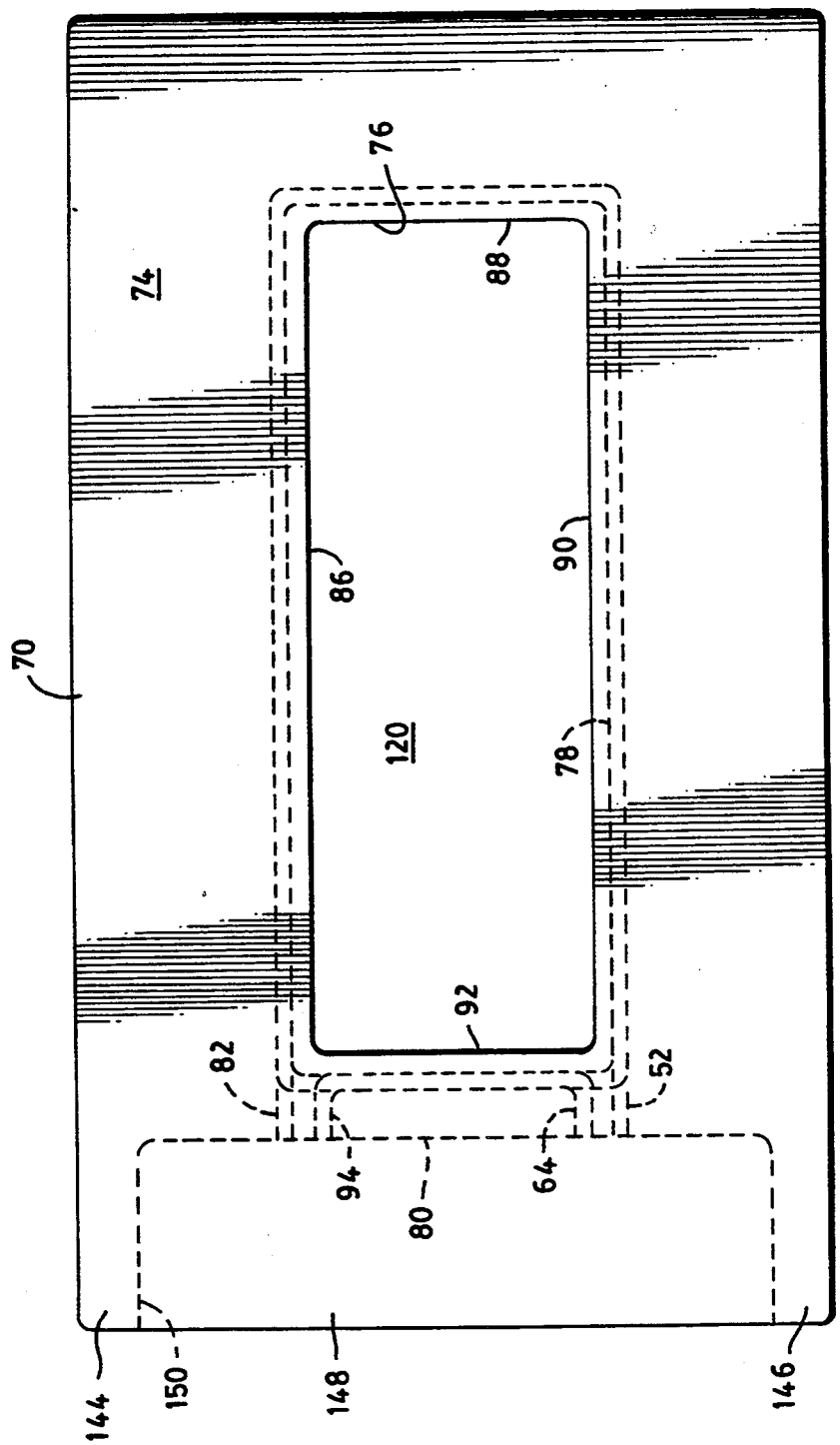
FIG. 3 is a side elevational view thereof.
Figure 4:
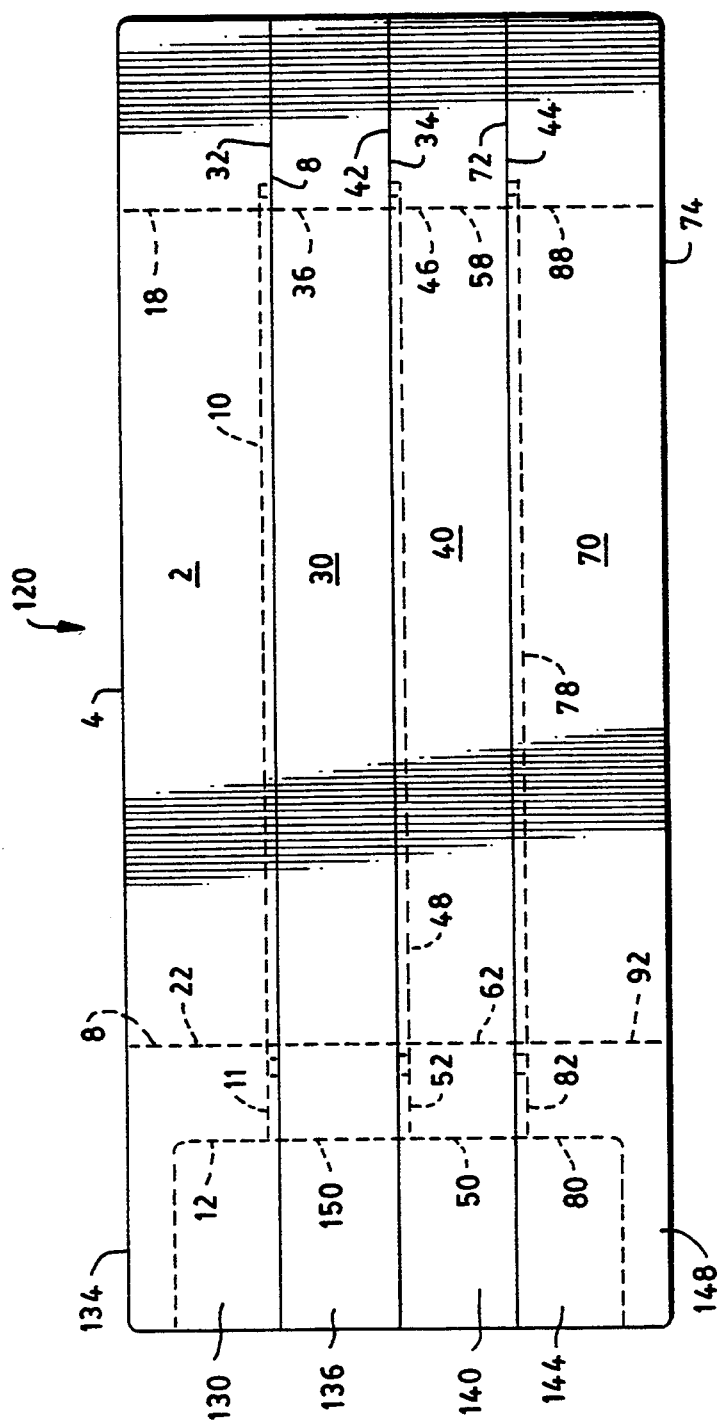
FIG. 4 is a top plan view thereof.

Upon completion of the frame members 2, 30, 40 and 70, including forming of the apertures 8, 36, 46, 76 and the grooves 10, 48, 78, electrically conductive strands are placed in the grooves. A first electrically conductive strand 100 is placed in the first groove 10 with lead portions thereof 102, 104 extending from the first frame member groove openings 14, 26 (FIG. 2). A second electrically conductive strand 106 is placed in the second groove 48 with lead portions 108, 110 extending from the third frame member groove openings 54, 66. And a third electrically conductive strand 112 is placed in the third groove 78 with lead portions 114, 116 extending from the fourth frame member groove openings 84, 96. The strands 100, 106 and 112 are bonded, as by cement, into their respective grooves.

The frame members are then bonded together such that the third face surface 32 of the second frame member 30 closes the first groove 10, with the first strand 100 in the first groove 10; the fourth face surface 34 of the second frame member 30 closes the second groove 48, with the second strand 106 in the second groove 48; and the sixth face surface 44 of the third frame member 40 closes the third groove 78, with the third strand 112 in the third groove 78.

The apertures 8, 36, 46 and 76, having been made coincident, that is, of substantially the same size and configuration, when viewed from a face surface, collectively form a passage 120 extending through the bonded frame members, with the electrically conductive strands 100, 106, 112 substantially encircling the passage 120 at three locations. Upon bonding together of the frame members 2, 30, 40, 70, the first and third grooves 10, 78 are disposed on opposite sides of the second groove 48 and are disposed a substantially equal distance from the second groove 48. Accordingly, the first and third electrically conductive strands 100, 112 are disposed on opposite sides of the second strand 106 and at substantially equal distances from the second strand 106. The second strand 106 comprises a "transmit coil" disposed substantially centrally of the frame assembly, and the first and third strands comprise "receive coils", the operation of which is well known in the art, to establish a force field.

To obtain proper spacing of the first and third strands 100, 112 from the central second strand, 106, the second frame member 30 is made of slightly less thickness than the third frame member 40. While sizes will be determined by requirements for a given device, in an illustrative apparatus the first and fourth frame members are 2.75 inches in thickness, the third frame member (having the second groove 48) 1.75 inch and the second frame member (no groove) 1.68 inch. Each groove is about 0.07 inch in width, such that the central strand 106 is disposed substantially mid-way between the first and third strands. The diameter of the electrical strands is about 0.07 inch, such that placement of the grooves determines precisely the subsequent placement of the strands.

The electrically conductive strand lead portions 102, 104, 108, 110, 114 and 116 may extend to electronic circuitry outside the frame assembly. Preferably, however, in forming of the frame members, the first frame member 2 is provided with upper, lower and side walls 130, 132 and 134, the second frame member 30 is provided with upper and lower walls 136, 138, the third frame member 40 is provided with upper and lower walls 140, 142 and the fourth frame member 70 is provided with upper, lower and side walls 144, 146 and 148. The frame member walls 130–148, when the frame members are joined together, in conjunction with the frame member edges, cooperatively form an assembly end cavity 150 adapted to receive and house the electronic circuitry (not shown) required for operation of the metal detector and to which the lead portions are fixed. A cover member (not shown) may be provided to close the end cavity 150.

Figure 6:
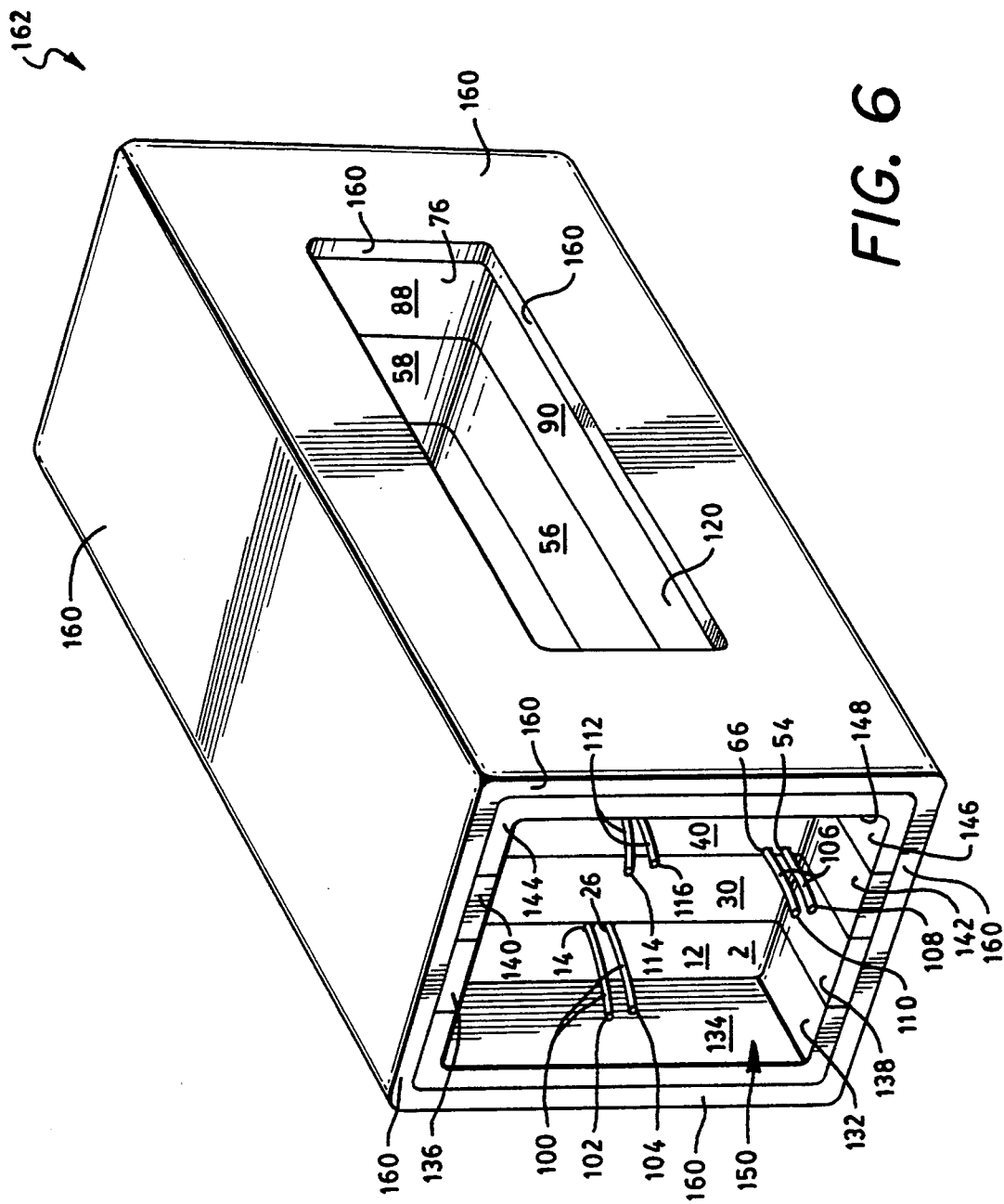
FIG. 6 is a perspective view, similar to claim 2, showing the frame assembly with a coating of metal thereon.
Figure 7:
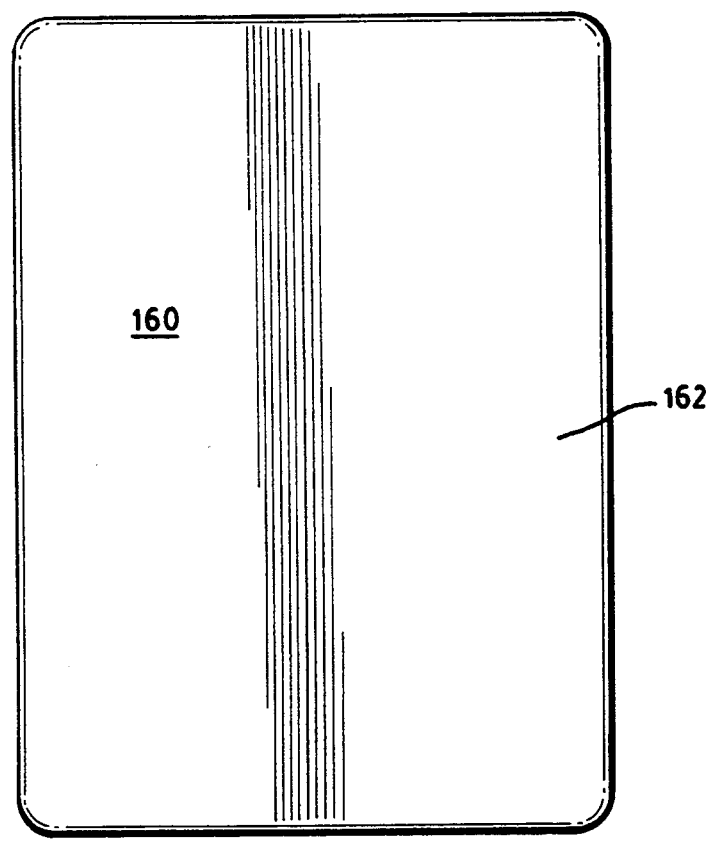
FIG. 7 is an end view of the frame assembly of FIG. 6.

To complete the search detector, a metal coating (FIGS. 6 and 7) is provided on the exterior of the bonded frame members. The coating 160 preferably is provided in fluid form, as by metallic painting, arc-spraying, plating, vacuum depositing, and the like. The metal coating 160 completely covers the two sides 4, 74, the top and bottom, and the closed end 162 of the frame assembly. The metal coating 160 further covers about a ¼-inch marginal portion of the passage 120 at either end thereof, and about a ¼-inch marginal portion of the rim formed around the end cavity 150. The metal preferably is tin/zinc, but may also be nickel or stainless steel. The metal coating preferably is of a thickness of at least 0.04 inch. For certain applications, it is preferable, when a coating of tin/zinc or nickel is used, to apply a further layer of stainless steel over the first coating. In the aperture, a graphite epoxy, or the like, coating is applied to the non-metal coated walls. The graphite may, in turn, be covered by a plastic wear surface, if the device is intended to inspect products with substantial moisture content, as for example, unpackaged meat products.

In summary, the making of the frame assembly includes the steps of forming the frame members, forming apertures therethrough, forming the grooves in the respective face surfaces of the frame members, disposing electrically conductive strands in the grooves, bonding the strands therein, bonding the frame members together, and applying a metallic coating. Forming the apertures and the grooves may comprise separate steps undertaken after forming of the frame members, or may be accomplished simultaneously with the forming of the frame members. An advantage to forming the apertures and grooves separately is that the frame members may be inventoried, with a given frame member size being adapted for a number of aperture sizes. Upon receipt of an order for an aperture of given size, frame members already in stock may be cut to appropriate aperture size.

It is to be understood that the present invention is by no means limited to the particular construction herein disclosed and/or shown in the drawings, but also comprises any modifications or equivalents within the scope of the claims. For example, while the invention is illustrated as having four frame members, it will be apparent that additional frame members could be used. In practice, for example, it has been found economical to provide first and fourth frame members which are themselves laminates of material. Further, while the illustrative example herein described comprises a frame of four sides with a rectangular passage therethrough, the construction may be used for the manufacture of metal detectors having round passages, as in free-fall detectors designed to detect metal fragments in product falling therethrough.

Having thus described my invention, what I claim as new and desire to secure by Letters Patent of the United States is:

1. A method of making a search coil frame assembly for a metal detector, said method comprising providing a plurality of frame members each having face surfaces, forming first and second grooves in selected face surfaces of said frame members such that each groove has the configuration of a loop and extends to an edge of a respective frame member, placing electrically conductive strands in the grooves and leading out from edges of respective frame members, and bonding the frame members together to close said grooves with the strands in the grooves, said frame members as bonded together forming a frame assembly with a passage therethrough to permit passage of articles through the frame assembly, said grooves being disposed such that the strands therein extend generally adjacent said passage and lead out from the frame assembly, one of said strands in a respective groove forming a transmit coil and the other of said strands in a respective groove forming a first receiving coil.

2. A method as set forth in claim 1 further comprising forming an aperture through each of a plurality of said frame members, the aperture through each such frame member being generally coincident in size and shape with the apertures through the other such frame members, and bonding said apertured frame members together such that the apertures are in registry with one another to form said passage.

3. A method for making a search coil frame assembly for a metal detector, said method comprising providing a plurality of frame members, providing each of said frame members with an aperture therethrough, said apertures each being coincident in size and shape with the remaining apertures, each of said frame members having opposite face surfaces, providing first, second and third grooves, respectively, in selected ones of said frame surfaces, forming said grooves such that each groove extends substantially around a selected one of said apertures and to an edge of the selected one of said frame members, placing electrically conductive strands in said grooves and leading out from said edges, and bonding said frame members together to close said grooves with said strands in said grooves, said grooves being disposed such that said first and third grooves are spaced from said second groove on opposite sides of said second groove, said apertures forming a passage through said bonded frame members, and said strands substantially encircling said passage and extending from said frame assembly.

4. The method in accordance with claim 3, including bonding of said conductive strands in said grooves.

5. The method in accordance with claim 3 in which said first and third grooves are spaced from said second groove by substantially equal distances.

6. The method in accordance with claim 3, including the additional step of coating the frame assembly top, bottom, sides and one end with a metallic material.

7. The method in accordance with claim 6, including coating marginal portions of either end of said passage with said metallic material.

8. The method in accordance with claim 6, including coating marginal portions of a second end of said frame assembly with said metallic material.

9. A method for making a search coil frame assembly for a metal detector, comprising providing a first frame member of non-electrically conductive material having first and second face surfaces, providing a first aperture through said first frame member, providing a first groove on said second surface of said first frame member, said first groove extending substantially around said first aperture and to an edge of said first frame member, providing a second frame member of said material having third and fourth face surfaces, providing a second aperture through said second frame member, said second aperture being coincident with said first aperture, providing a third frame member of said material having fifth and sixth face surfaces, providing a third aperture through said third frame member, providing a second groove in said third frame member fifth face surface, said second groove extending substantially around said third aperture and to an edge of said third frame member, said third aperture being coincident with said second aperture, providing a fourth frame member of said material having seventh and eight face surfaces, providing a fourth aperture therethrough, providing a third groove on said seventh surface of said fourth frame member, said third groove extending substantially around said fourth aperture and to an edge of said fourth frame member, placing electrically conductive strands in said first, second and third grooves, and bonding said frame members together, said fourth frame member being adjacent said third frame member, said third frame member being adjacent said second frame member, and said second frame member being adjacent said first frame member, said apertures thereby forming a passage through said bonded frame members, and said conductive strands being disposed in said grooves and extending outwardly from said frame member edges.

10. The method in accordance with claim 9, including bonding of said conductive strands in said grooves.

11. The method in accordance with claim 9, wherein said second frame member is formed having a thickness less than said third frame member, the difference in thicknesses being such as to facilitate placement of said second groove midway between said first and third grooves.

12. The method in accordance with claim 9, wherein each of said grooves is formed with two openings in said edges of said frame members, and each of said strands is placed in its groove with a pair of leads extending from said openings.

13. The method in accordance with claim 12, in which said first and fourth frame members are each formed with an upper, a lower, and a side wall at an end of said frame member and said second and third frame members are each formed with an upper and a lower wall at an end of said frame member, such that upon said bonding together of said frame members said walls and said edges form a compartment at one end of the frame with said leads extending into said compartment.

14. The method in accordance with claim 13 and including the additional step of coating the frame assembly top, bottom, sides and closed end with a metallic material.

15. The method in accordance with claim 14, including coating marginal portions of either end of said passage with said metallic material.

16. The method in accordance with claim 14, including coating marginal portions of said edges around said compartment with said metallic material.

17. The method in accordance with claim 14 wherein said coating is applied at least 0.04 inch thick.

18. The method in accordance with claim 17 wherein said metallic material comprises a material selected from a group comprising tin/zinc, nickel, and stainless steel.

19. The method in accordance with claim 17 wherein said coating comprises two layers, a first of said layers comprising a material selected from a group comprising tin/zinc and nickel, and a second of said layers comprising stainless steel.

20. The method in accordance with claim 19 wherein said second layer is applied over said first layer.

* * * * *